I. W. LITTLE.
Horse-Hitching Devices.

No. 214,928.        Patented April 29, 1879.

Attest:
Louis Cohen.
H. E. Bathrick.

Inventor:
Isaac W. Little,
per Edw. Dummer,
Atty.

UNITED STATES PATENT OFFICE.

ISAAC W. LITTLE, OF NEWBURY, MASSACHUSETTS.

IMPROVEMENT IN HORSE-HITCHING DEVICES.

Specification forming part of Letters Patent No. 214,928, dated April 29, 1879; application filed September 7, 1878.

*To all whom it may concern:*

Be it known that I, ISAAC W. LITTLE, of Newbury, in the county of Essex and State of Massachusetts, have invented a new and useful Improvement in Rein-Holders, which improvement is fully set forth in the following specification, reference being had to the accompanying drawings.

My invention relates to a device for a check on a horse, to serve the purpose of a "hitch;" and it consists, first, in the manner of locating and connecting the hitching-rein in reference to the horse; and, secondly, in the manner of fastening the hitching-rein to the carriage-wheel.

Figure 1:
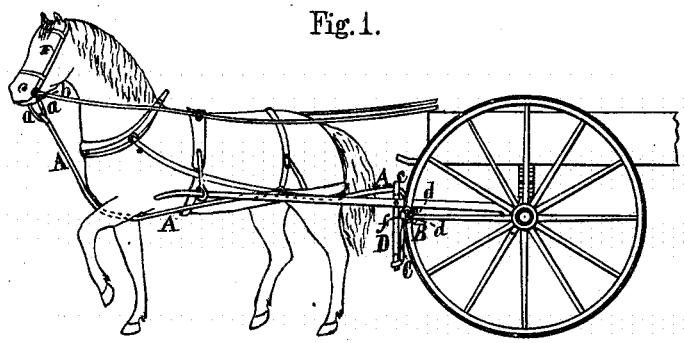
Figure 2:
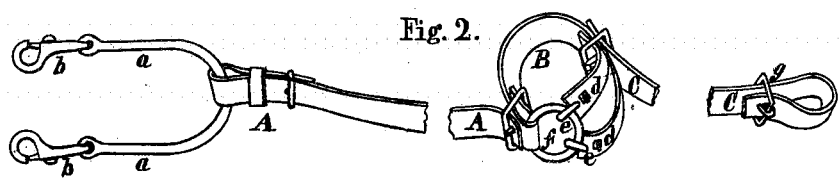

In the drawings, Figure 1 shows so much of horse, harness, and carriage having my device attached as serves for illustration. Fig. 2 is a view of the parts for hitching removed from the carriage, drawn on a larger scale.

A is a strap or the hitching-rein, which I attach to the horse by connecting the two branches *a a* of one end to the bit, as by hooking the hooks *b b* into the rings of the bit. This rein A extends down to and between the fore legs of the horse, and along the side of the horse to and through or over a rest or loop, *c*, attached to one of the shafts. At this end of the rein A is a strap or band, B, which is made as follows: The band B is of suitable length to pass around the felly of the wheel, one end of the band B being divided into two portions, *d d*. These portions, when the band is attached to the wheel, pass, one on one side of a spoke, and the other on the other side, and each has a hook, *e*, at the end. The other end of the band B has an opening or ring, *f*, to receive the hooks *e e*.

To the strap or band B is fastened one end of a strap, C, which has at the other end the buckle *g* for fastening it to a projection, D, which extends downward from the shaft.

In use it is intended that the rein A shall remain attached to the bit, and extend between the fore legs and along beside the horse to the loop or rest *c*, and that the strap C be fastened at the lower end to the lower end of the projection D, as aforesaid. When it is desired to hitch the horse the band B is clasped about the felly and a spoke, as shown and described, and, being so arranged and fastened, the forward movement of the horse by revolving the wheel will cause a draft on the rein and the horse will be checked, the place of fastening the band B on the wheel being about opposite the shaft, and hence the strap C allowing a forward motion of the wheel for the needed distance. Should the horse back the strap C will be drawn taut and the wheel will be prevented from revolving in that direction. When it is desired to unhitch the horse the band B is unclasped from the wheel and clasped, for security, about the shaft or other suitable attachment on the carriage.

Connecting the rein A to the bit and passing it between the fore legs causes an equalized draft on the horse, while it may serve the purpose of a martingale. Clasping the band B about both the felly and spoke makes a secure hold in the position desired in a simple and effective manner. Fastening the band B and strap C in reference to each other as shown allows a sufficient movement of the wheel forward—namely, twice the length of the strap C—while the wheel cannot move back but very little.

I claim as my invention—

1. The hitch-rein A, attachable, by means of the two branches *a a* of one end, to the bit, and adapted to be passed between the fore legs of the horse, in combination with a band, B, for fastening the other end to the carriage-wheel, substantially as specified.

2. The band B, constructed and arranged to clasp about both the felly and spoke of a wheel, in combination with the hitch-rein A, substantially as hereinbefore set forth.

3. The combination of the hitch-rein A, band B, and strap C, the latter connected at one end to a downward-extending projection, D, all constructed and arranged substantially as hereinbefore described.

ISAAC W. LITTLE.

Witnesses:
EDW. DUMMER,
M. A. BLAKE.